(12) United States Patent
Cukman et al.

(10) Patent No.: US 9,789,998 B2
(45) Date of Patent: Oct. 17, 2017

(54) METHOD FOR PRODUCING A BOTTLE WITH AN ATTACHED OBJECT AND BOTTLE THUS PRODUCED

(71) Applicant: Rosemarie Cukman, Weinburg am Sassbach (AT)

(72) Inventors: Rosemarie Cukman, Weinburg am Sassbach (AT); Helmut Raggam, Weinburg am Sassbach (AT)

(73) Assignee: Rosemarie Cukman, Weinburg am Sassbach (AT)

( * ) Notice: Subject to any disclaimer, the term of this patent is extended or adjusted under 35 U.S.C. 154(b) by 0 days.

(21) Appl. No.: 14/891,785

(22) PCT Filed: Feb. 5, 2014

(86) PCT No.: PCT/AT2014/050035
§ 371 (c)(1),
(2) Date: Mar. 17, 2016

(87) PCT Pub. No.: WO2014/121317
PCT Pub. Date: Aug. 14, 2014

(65) Prior Publication Data
US 2016/0214764 A1    Jul. 28, 2016

(30) Foreign Application Priority Data
Feb. 6, 2013    (AT) .............................. GM50015/2013

(51) Int. Cl.
*B65D 23/14*    (2006.01)
*C03B 9/32*    (2006.01)
(Continued)

(52) U.S. Cl.
CPC ............. *B65D 23/14* (2013.01); *B65D 1/023* (2013.01); *B65D 23/12* (2013.01); *C03B 9/32* (2013.01); *C03B 9/347* (2013.01); *C03B 23/26* (2013.01)

(58) Field of Classification Search
CPC ........ B65D 23/14; B65D 23/12; B65D 1/023; B65D 1/40; B65D 11/20; C03B 9/32; C03B 9/347; C03B 23/26
(Continued)

(56) References Cited

U.S. PATENT DOCUMENTS 1,554,191 A    9/1925    Alexander
1,856,550 A *  5/1932    Guenard ................ B65D 23/12
                                                 40/27.5
(Continued)

FOREIGN PATENT DOCUMENTS

CN    101522535    9/2009
DE    8715959    3/1988
(Continued)

OTHER PUBLICATIONS

Austria Search Report conducted in counterpart Austria Appln. No. GM 50015/2013 (Nov. 25, 2013).
(Continued)

*Primary Examiner* — Robert J Hicks
(74) *Attorney, Agent, or Firm* — Greenblum & Bernstein, P.L.C.

(57) ABSTRACT

The invention relates to a method for producing a bottle (1) made of, for example, glass, more particularly a beverage bottle, wherein an object (2) is attached to the bottle (1). According to the invention, production of a bottle (1) with permanent added value is simplified in that the bottle (1) is
(Continued)

Figure 1:
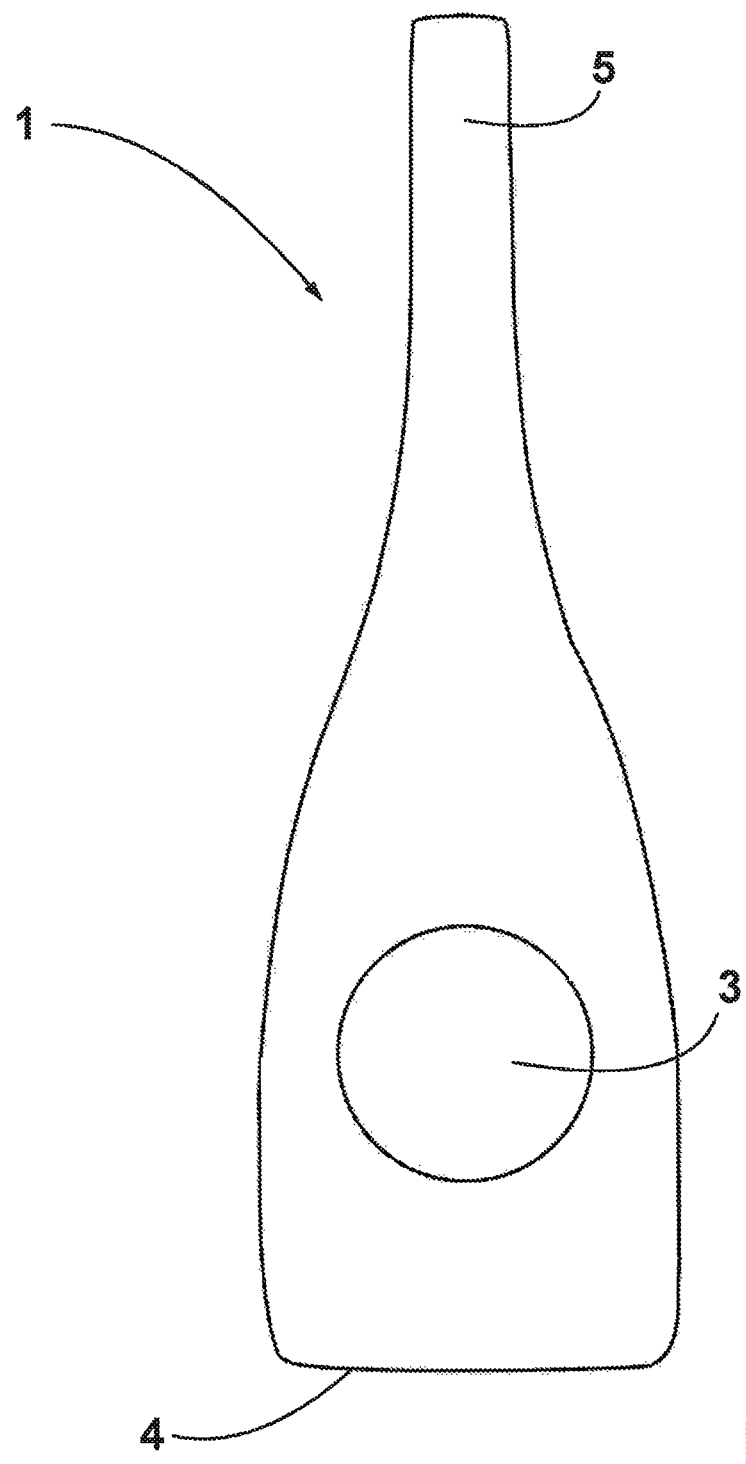

designed with a recess (3) and the object (2) is detachably attached in the recess (3). The invention also relates to a bottle (1) thus produced.

27 Claims, 6 Drawing Sheets

(51) Int. Cl.
    *C03B 9/34*     (2006.01)
    *C03B 23/26*     (2006.01)
    *B65D 23/12*     (2006.01)
    *B65D 1/02*     (2006.01)
    *C03B 9/347*     (2006.01)

(58) Field of Classification Search
    USPC ........ 215/382, 383, 379, 365; 220/675, 669,
                      220/62.15; 40/323, 310; 65/153
    See application file for complete search history.

(56) References Cited

U.S. PATENT DOCUMENTS

| | | | |
|---|---|---|---|
| 2,040,381 A * | 5/1936 | Hull | B65D 55/022 |
| | | | 215/365 |
| 5,156,283 A * | 10/1992 | Sampson | A47G 19/2227 |
| | | | 206/457 |
| 5,201,431 A | 4/1993 | Berger et al. | |
| 8,100,278 B2 | 1/2012 | Dlouhy | |
| 2004/0004829 A1 * | 1/2004 | Policappelli | A47G 19/025 |
| | | | 362/101 |
| 2004/0076109 A1 | 4/2004 | Rosowski | |
| 2004/0226904 A1 | 11/2004 | Schroeder | |
| 2005/0067414 A1 | 3/2005 | Lipson | |
| 2005/0263413 A1 | 12/2005 | Harman et al. | |
| 2006/0042969 A1 | 3/2006 | Swan et al. | |
| 2007/0193913 A1 | 8/2007 | Schroeder | |
| 2008/0110774 A1 * | 5/2008 | Chisholm | G06K 19/07749 |
| | | | 206/216 |
| 2010/0006534 A1 | 1/2010 | Dlouhy | |
| 2011/0042399 A1 | 2/2011 | Schroeder | |
| 2011/0100852 A1 | 5/2011 | Goldburt | |
| 2013/0047675 A1 | 2/2013 | Benoit et al. | |

FOREIGN PATENT DOCUMENTS

| | | |
|---|---|---|
| DE | 20 2006 000 598 | 5/2006 |
| EP | 2551244 | 1/2013 |
| FR | 15346 | 6/1912 |
| FR | 615405 | 1/1927 |
| FR | 2761663 | 10/1998 |
| GB | 2323831 | 10/1998 |

OTHER PUBLICATIONS

China Search Report conducted in counterpart China Appln. No. 201480006808.9 (Dec. 22, 2016) (w/ English translation).

* cited by examiner

METHOD FOR PRODUCING A BOTTLE WITH AN ATTACHED OBJECT AND BOTTLE THUS PRODUCED

The invention relates to a method for producing a bottle made of, for example, glass, in particular a beverage bottle, wherein an object is attached to the bottle.

Furthermore, the invention relates to a bottle made of, for example, glass, in particular a beverage bottle, wherein an object is attached to the bottle.

On festive occasions, anniversaries, important personal events and the like, it is very common to give the person who is the focus of attention a bottle of wine, bottle of sparkling wine or possibly even a bottle of champagne. It is known that the bottles given as a gift are often decorated with an additional present in order to give the gift a higher value overall. For example, it is common to attach a currency note, the value of which is considerably higher than the value of a wine bottle, to the neck of a bottle using a string. The gift in the form of the combination of a bottle of wine with a currency note attached thereto then has a total value in which the proportion of the currency note is typically significantly higher than that of the wine.

However, it is thereby disadvantageous that the currency note is normally immediately removed. The bottle of wine, or possibly other liquor, remains which on its own no longer has any special value. The intended high value of the gift is thus quickly lost. It is also disadvantageous that gifts of this type can only be assembled individually in private. It is difficult to conceive of the sale of such individualized high-value gift packages in commercial transactions, especially because offering such packages for sale in a store is hardly possible without risking theft due to the loose attachment of the currency notes.

This is addressed by the invention. The object of the invention is to specify a method of the type named at the outset with which a highly valuable, longest-lasting possible gift with a bottle can be created in a simple manner, wherein it is also possible, however, to remove the special, in particular, more valuable, piece attached to the bottle with relative ease if necessary.

Furthermore, an object of the invention is to specify a bottle formed accordingly.

The method-related object of the invention is attained if, in a method of the type named at the outset, the bottle is designed with a recess, whereupon the object is detachably attached in the recess.

With a method according to the invention, it is possible to produce a bottle with an object attached thereto, which object essentially remains permanently connected to the bottle but, because of the detachability, can also be removed if needed. As a result, it is in particular possible to place highly valuable objects, such as jewelry or diamonds, on the bottle so that the combination of the bottle and the object attached thereto forms an easy-to-handle fixed unit that can also be presented in sales rooms without a significant risk of theft. If necessary, the object can be detached from the bottle, for example if the recipient of the gift is in financial need and the object can be sold for economic gain. Because of the recess provided, the object can be positioned advantageously therein, so that an attachment of the object to the neck of the bottle, and thus a loose dangling about, is unnecessary. Instead, in terms an overall visual impression on its own, the bottle retains its original appearance and the object attached to the bottle is positioned flush with the surface of the bottle in the region in which the object is attached. In addition to objects of particularly high value, less valuable objects can thereby also be provided that, on the other hand, are suitable for customizing the bottle in a special manner, for example small chocolate discs with promotional messages.

The bottle can thereby be composed of any desired material, for example, a plastic, a metal or a composite material, but is preferably made of glass.

In principle, the recess can be introduced at any desired point in time, for example, even after the bottle is produced. However, it is preferred that the bottle is formed with the recess during the shaping of the bottle. For this purpose, corresponding molds are expediently provided which already permit the formation of the recess during the bottle production, for example, from liquid glass at increased temperatures. A shape of the mold is thereby designed accordingly in the region of the recess. To allow the recess to be introduced with the mold in a simple manner, the recess is formed without undercutting or grooving. For the formation of the recess, it is also expedient if the recess is designed in a conically widening manner in an outward direction. This allows the bottle to be easily detached from the mold. A base of the recess can then be embodied particularly in a flat or planar manner.

Essentially, the particular shape of the recess is not of critical importance. This shape depends on the object that is to be subsequently attached. For many purposes, it is advantageous if the recess is embodied in the form of a circle. However, other shapes of the recess are clearly also possible, for example, square, rectangular, pentagonal or octagonal.

The recess can be introduced at any desired positions on the bottle depending on where the object is to be subsequently attached. To ensure that the object, which usually has a particularly high material value, is very highly visible, the recess is advantageously introduced between a base and a neck of the bottle. The recess can, for example, be provided roughly centrally in the region of a bottle. The object is thus immediately visible and directly signals to a potential customer the added value of the combination of the bottle and the object attached thereto. It is also possible to provide multiple recesses and to occupy each of these recesses with an object.

For attaching the object, any attachment methods can be used that allow the object to be attached in the recess of the bottle on the one hand and, on the other hand, also allow the object to be removed again without damage. In particular, these include an attachment by means of double-sided adhesive tapes or materially bonded connections which can be easily released again by human strength and leave no traces on the previously attached object. However, it is particularly preferable that the object is accommodated in an at least partially flexible adapter and is positioned in the recess using the adapter. The flexibility of the adapter thereby has a dual function: With the flexibility of the adapter, the object can on the one hand be attached in the adapter with relative ease hand while also being detached from the adapter again, for example, by a clamping and subsequent releasing. On the other hand, the adapter with the already accommodated object can then also be easily positioned in the recess of the bottle, since the adapter is somewhat pliable because of its flexibility and the adapter can therefore be easily clamped in the recess so that the object is stably attached to the bottle until the adapter is detached. For this purpose, it is expedient that an adapter made of a plastic is used. The plastic is elastically deformable so as to ensure the desired flexibility. For this purpose, the adapter is preferably embodied such that it matches the recess in order to be clamped into the recess with the object.

Full-area adapters that accommodate the object and completely cover the surface of the recess are possible. However, ring-shaped adapters can also be provided with which a clamping effect is achieved by an interaction between the object to be accommodated and the recess in that the adapter positioned therebetween is elastically deformed. The flexible adapter can also be embodied as a strip, for example, a metal strip or plastic strip. Regardless of the specific embodiment, the adapter can also additionally comprise light sources such as LEDs in order to illuminate the object and thus display it more effectively.

Specifically, it is advantageous that a multi-part adapter with a bottom part and a top part is used, wherein the object is accommodated between the bottom part and the top part. The bottom part can be fixed to the bottle on the base of the recess, whereas the top part is accommodated by the bottom part and fills the recess. For an optimal appearance, but also to allow the bottle to be easily handled, the surface of the bottle can be completed by the top part in a flush and flat alignment.

It is advantageous if the bottom part of the adapter is embodied with a harder component and a softer component, wherein the harder component is fixed to the bottle. The harder component then accommodates the softer component, which in turn accommodates the top part of the adapter and is embodied in a flexible or pliable manner for this purpose. The harder component and the softer component can be detachably connected by fitting one into the other. The top part of the adapter can be fitted onto the softer component so that the top part can be detached again with an acceptable application of force in order to, for example, remove or replace the object.

To keep the object positionally stable in the adapter, an intermediate piece can be positioned between the bottom part and the top part of the adapter to fix the object in place.

In principle, any desired objects can be provided. However, in order to also give the bottle the desired added value in addition to an attractive visual appearance, a coin is preferably used as an object.

The other object of the invention is attained by a bottle of the type named at the outset, wherein the bottle is formed with a recess in which the object is detachably attached.

A bottle according to the invention has, among other things, the advantage that, as a result of the recess provided, a highly valuable object can be accommodated which gives the bottle an added value, wherein it is however also possible to remove the object from the bottle if necessary. In particular, it is also possible to present bottles thus formed in sales rooms of shops without a significant risk of the intrinsically valuable objects being stolen.

Advantageously, the recess is arranged between a bottle base and a bottle neck in order to display, in the clearest possible manner, the value added to the bottle by the attached object.

The recess is formed with the advantage of a simple production without undercutting or grooving. Here, it can be provided in particular that the recess is formed in a conically widening manner in an outward direction.

The recess is typically embodied in the form of a circle, although other designs are also considered. Preferably, the recess is embodied with a flat base, which facilitates a flat affixing of an object in the recess.

It can also be provided that the object is accommodated in an at least partially flexible adapter and is positioned in the recess with the adapter. Both the object in the adapter and also the adapter with the object can then be detachably fixed in place in the recess with ease. For this purpose it can be particularly provided that the adapter is formed from a plastic. In this case, the object can in particular consist of a coin which is typically made of a metal and thus, due to the lower elastic deformability, deforms the adapter, which in turn must, also because of its low deformability, match the recess of the bottle made of glass. Generally, the adapter is made of a plastic and the object is composed of a less deformable material than the plastic, for example, of a metal such as a precious metal or of one or more gemstones. Of course, it is thereby possible that multiple objects are positioned in a single recess.

In a preferable embodiment, the adapter is embodied in multiple pieces with a bottom part and a top part, and the object is accommodated between the bottom part and top part. The object can thus be held in position perfectly. For an attractive appearance, it is expedient that a surface of the bottle is completed by the top part in a flush and flat alignment.

The bottom part of the adapter can be embodied with a harder component and a softer component, wherein the harder component is fixed to the bottle. In this case, the harder component and the softer component are advantageously connected by fitting one into the other. The top part of the adapter can then be fitted onto the softer component.

In order to permanently hold the object in a stable manner, an intermediate piece can be positioned between the bottom part and the top part of the adapter to fix the object in place.

Figure 2:
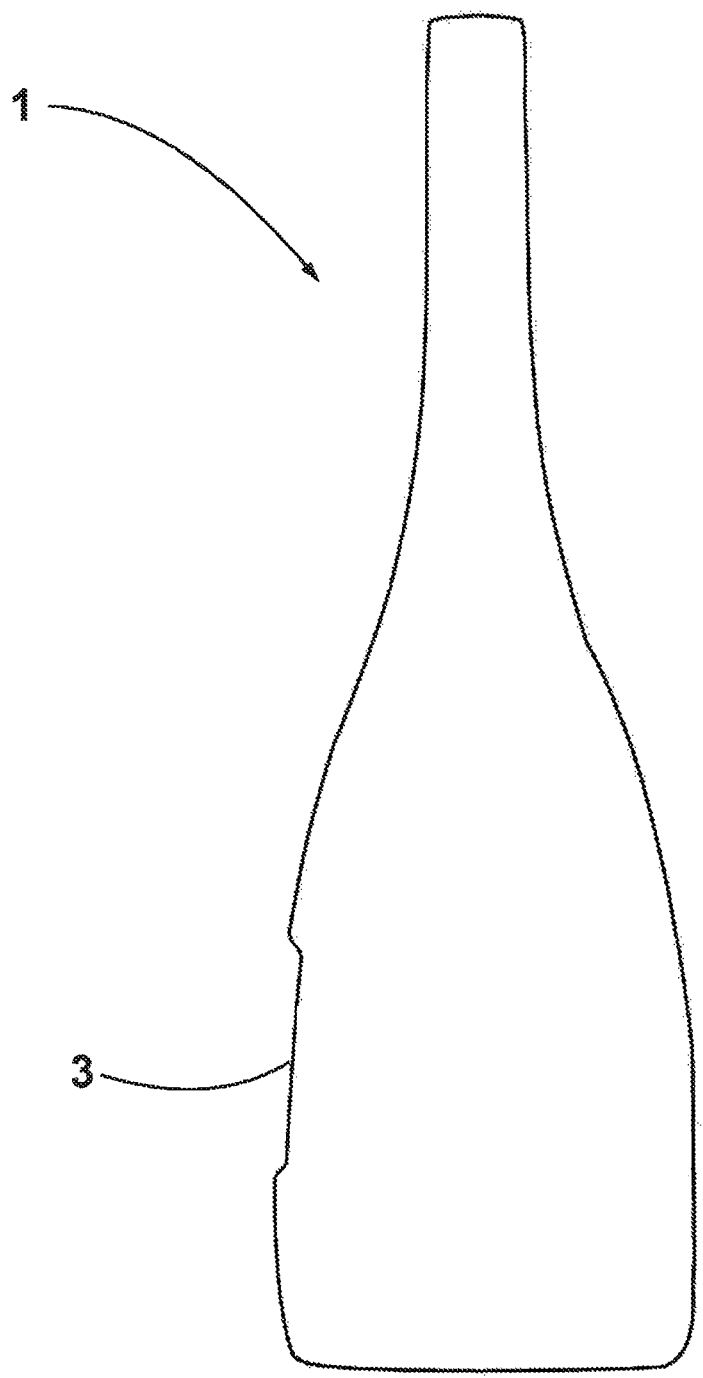
Figure 3:
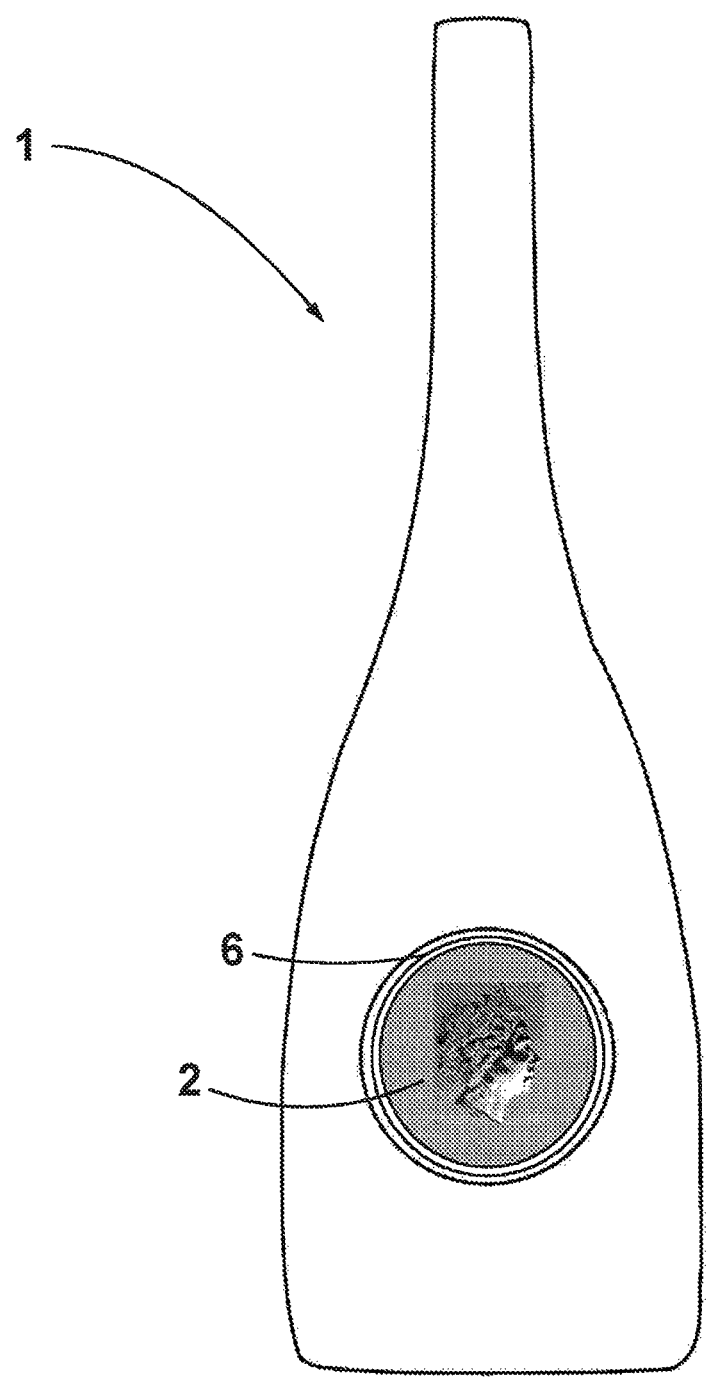
Figure 4:
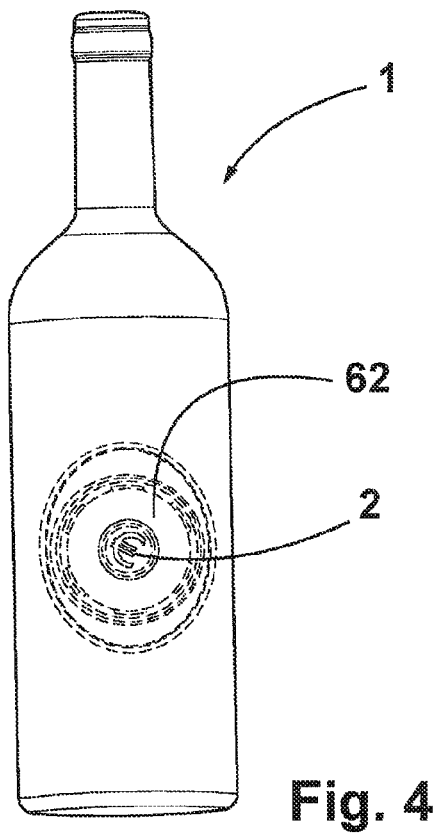
Figure 5:
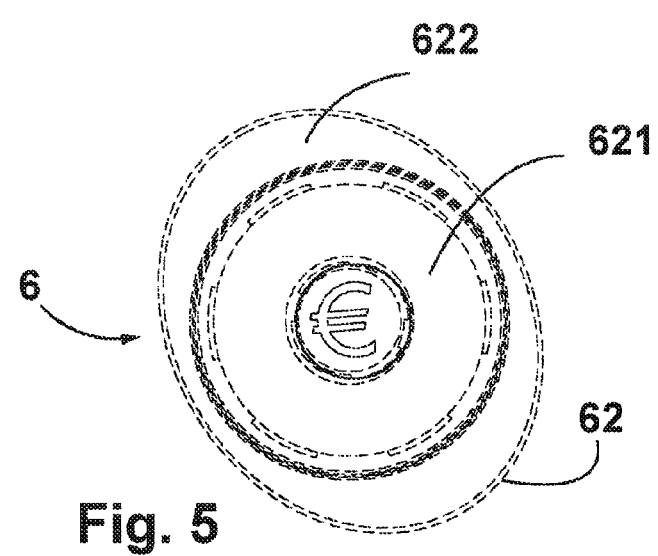
Figure 6:
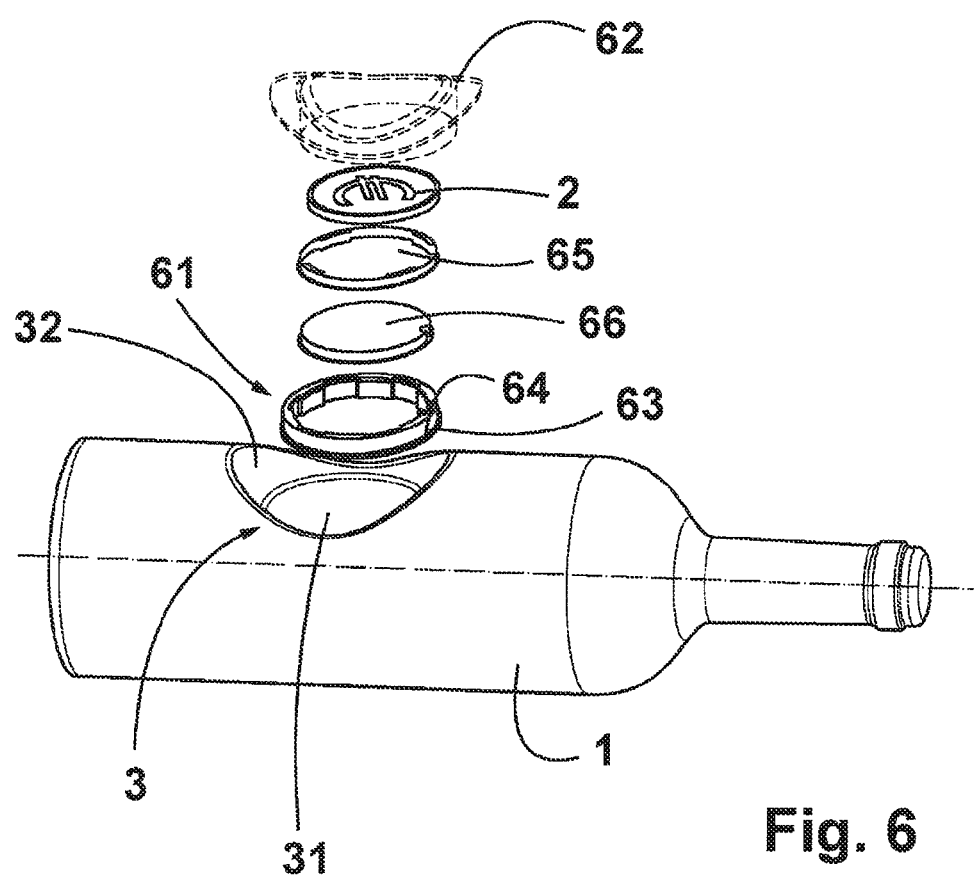
Figure 7:
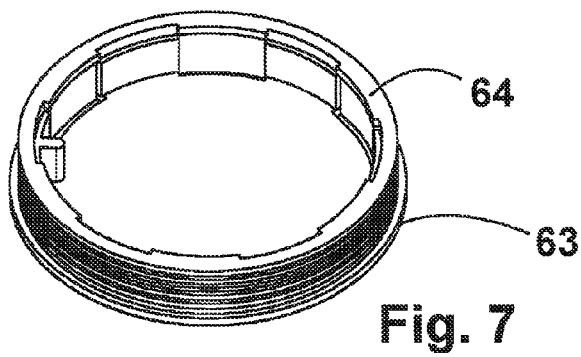
Figure 8:
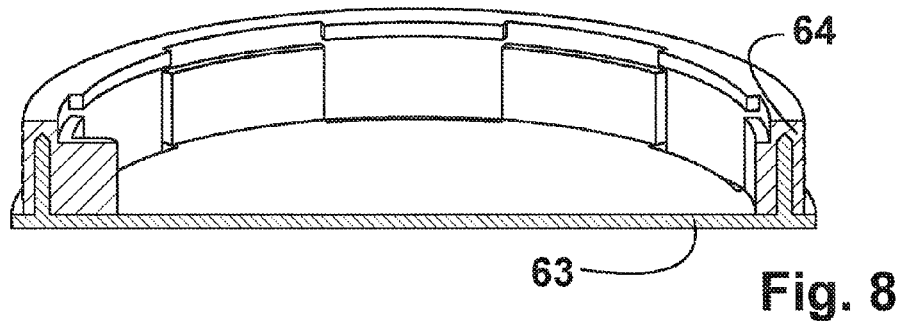
Figure 9:
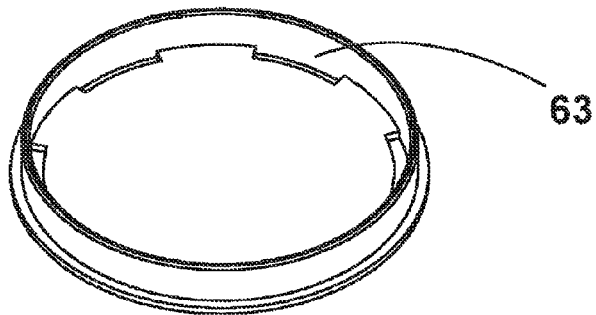
Figure 10:
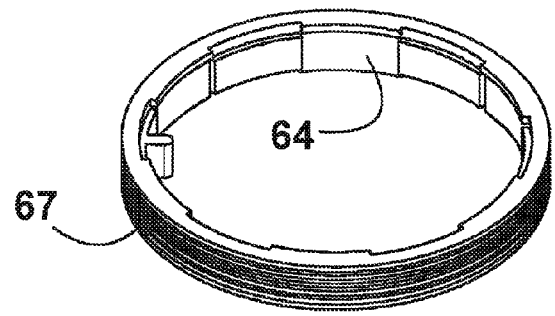

Additional features, advantages and effects of the inventions follow from the exemplary embodiment described below. The drawings which are thereby referenced show the following:

FIG. 1 A bottle with a recess in a side view;

FIG. 2 A bottle according to FIG. 1 in a front-face view;

FIG. 3 A bottle according to the invention;

FIG. 4 Another bottle according to the invention;

FIG. 5 An adapter;

FIG. 6 An exploded view of a bottle with an adapter;

FIGS. 7 through 10 Individual pieces of a bottom part of an adapter.

A bottle 1 with a recess 3 is illustrated in FIG. 1. The bottle 1 comprises a bottle base 4 and a bottle neck 5. A closure such as a screw-top or a cork can be positioned on the bottle neck 5. The recess 3 is positioned between the bottle base 4 and the bottle neck 5. In principle, however, the recess 3 could also be provided in the region of the bottle base 4, although this is less useful for the purposes of presentation. The recess 3 can be embodied in any desired shape, but is preferably embodied in a round manner according to FIG. 2. Other preferred designs concern in particular a rectangular shape. A height of the recess 3 is thereby sized such that a stability of the bottle wall is ensured during the production process. Therefore, the recess 3 is expediently at most half as deep as the bottle wall in the region around the recess 3.

An object 2 can be inserted into the recess 3, which can be seen in FIGS. 1 and 2. Expediently, this occurs in such a manner that the object 2, for example a coin, a slice of a meteorite, or another highly valuable object, is first arranged in an adapter 6 made of an elastically deformable plastic, preferably a transparent plastic. If the recess 3 is a round recess 3 as illustrated in FIGS. 1 and 2, the adapter 6 is also embodied in a round manner, and the outer diameter thereof is approximately equal to the inner diameter of the recess 3. The adapter 6 is itself normally also embodied with an indentation in which the object 2 is first positioned.

The adapter 6 with the object 2 held therein is then arranged in the recess 3. If the adapter 6 is made of an elastic plastic, and if an outer diameter of the adapter 6 is slightly larger than the diameter(s) of the recess 3, the adapter 6 with the object 2 can be easily positioned in the recess 3 by being clamped into place, as can be seen in FIG. 3. The object 2 arranged on the bottle 2 in such a manner is then essentially permanently attached to the bottle 1, but can be manually detached from the bottle again if necessary by an application of moderate force.

A production of the bottle 1 with the recess 3, which serves as the primary product for the eventual attachment of the object 2, is expediently performed in such a manner that the recess is also already formed during the creation of the bottle 1. This is possible without difficulty by means of a corresponding shaping of molds. It is, of course, alternatively conceivable that the recess is introduced afterwards, which however is significantly more costly.

The preceding exemplary embodiment is based on a typical liquor bottle such as a wine bottle. Of course, it is possible to also apply the illustrated concept to other bottles made of glass, for example, perfume bottles or other types of bottles.

In FIGS. 4 through 10, a further exemplary embodiment of a bottle 1 according to the invention with an adapter 6 is illustrated, wherein the adapter 6 is constructed in multiple parts. The adapter 6 is embodied in multiple pieces with a bottom part 61 and a top part 62. In the front-face view according to FIG. 4, only the top part 62 is visible, which part is made of a transparent material, in particular a transparent and preferably at least slightly elastically pliable plastic. Because of the transparency of the top part 62, an object 2 attached to the bottle 1 is visible. According to FIG. 5, the top part 62 of the adapter 6 is designed with a high-gloss polished surface 621 and a matte surface 622. As a result of this design, the focus is more markedly directed to the object 2. The surface 622 can also be designed differently, for example, by incorporating a logo that is introduced into the surface 622 during injection molding or in another production process.

In FIG. 6, a structure of a bottle 1 according to the invention with a multi-part adapter 6 is illustrated in greater detail in an exploded view. The components forming the bottom part 61 are illustrated separately in FIGS. 7 through 10. As can be seen in FIG. 6, the bottle 1 is embodied with a recess, wherein the recess 3 comprises a flat base 31. In the outward direction, the recess 3 has a conical widening 32. The recess 3 is introduced during the creation of the bottle 1, which is usually composed of a glass. The difficulty here is in forming the bottle 1 with the recess 3 without the recess 3 constituting a weak point that leads to easy breakage. To achieve this, the wall of the bottle 1 is, in the region of the recess 3, formed with a thickness that is maximally reduced to half the thickness of the bottle 1 in the remaining regions. The smaller thickness of the bottle 1 in the region of the recess 3 necessarily results in a lower ability to withstand stress; however, since the adapter is inserted later and aligns flush with a surface of the bottle 1, no particularly high pressure can be applied to the recess 3 or the base 31 thereof during normal handling, so that a risk of breakage is ultimately low despite the minimized thickness in the region of the recess 3. As mentioned, the adapter 6 is constructed in multiple pieces and comprises the bottom part 61 and the top part 62 as well as an intermediate part 65. The bottom part 61 itself is likewise constructed in multiple pieces and comprises a harder component 63 and a softer component 64. The harder component 63 is present as a circular ring and is attached to the base 31 of the recess 3. Attachment usually takes place by means of bonding. The softer component 64, which subsequently serves as a seal for the part located inside, is fitted into the harder component 63 of the bottom part 61. While being fitted together, the softer component 64 snaps into the harder component 63 by means of corresponding notches. In particular, the softer component 64 can be fitted into the harder component 63 and positionally secured against rotation, as can be seen in the cross-section in FIG. 8. The softer component 64 is formed with radially circumferential ribs 67 in the region of an outer side. If provided, the bottom part 61 attached to the bottle 1 then accommodates a printed circuit board 66 and power supply. The intermediate piece 65 follows the printed circuit board 66, which intermediate piece acts as a holder for an object 2 that is to be attached, particularly a coin as illustrated. The intermediate piece 65 or the holder is also embodied in a circular manner and is designed to accommodate an object 2 of a certain size on a top side. If, for example, coins of different sizes are used, the intermediate piece 65 is embodied accordingly for the precisely fitting accommodation of a coin of the respective size. The recess 3 is closed by the top part 62, which is embodied in an outwardly curved manner. The top part 62 is thereby embodied on the outside in such a manner that the surface of the bottle 1 is completed by the top part 62 while creating a typical bottle shape. In this manner, the bottle 1 can be suitably gripped without there being, as previously mentioned, a particularly increased risk of breakage in the region of the recess 3, where a reduced wall thickness of the bottle 1 is present. During attachment, the top part 62 engages the outside of the ribs 67 of the softer component 64 of the bottom part 61. Because of the ribs 67 provided, the top part 62 can be fitted relatively easily and fixed detachably to the bottom part 61. However, the grip of the top part 62 on the softer component 64 of the bottom part 61 is so strong that the top part does not detach from the bottom part 61 without difficulty during typical use of the bottle 1. Like the softer component 64 of the bottom part 61, the top part 62 is formed from a plastic that exhibits a certain minimum elasticity so that these parts can be pressed against one another with relative ease, even if additional components are accommodated therebetween in the form of the intermediate piece 65 and the printed circuit board 66. The printed circuit board 66 in FIG. 6 is not necessary, but can be provided if the printed circuit board 66 is, for example, embodied with LEDs or other components. For example, an array of LEDs arranged in a ring-shaped manner can be provided on the printed circuit board 66 below the matte surface 621 of the top part 62, which LEDs are actuated by the printed circuit board 66 and are run by the power supply provided. It is thus also possible to direct a focus to the object 2 attached to the bottle 1, since light emitted by the LEDs exits the adapter 6 alongside the object 2. The printed circuit board 66 and also the object 2 are protected against external influences by the softer component 64, which has a sealing effect.

A structure according to FIGS. 6 through 10 results in the advantage that, with an essentially identically designed adapter 6, objects 2 of a differing size can be attached to different bottles 1. For this purpose is it merely necessary to adequately adapt the intermediate piece 65 to the individual object 2, such as a coin. Because of the coordination of the material properties of the top part 62 made of a somewhat pliable plastic and a corresponding embodiment of the bottom part 61 with a harder component 63 and with a softer component 64 interacting with the top part 62, there additionally results the advantage of a sealed connection that can also be important, in particular for accommodating a printed circuit board 66, in order to ensure a durability of the product.

If a printed circuit board 66 is provided together with a power supply such as a rechargeable battery, it can be expedient to route thin metal wires, such as gold wires, out of the top part 62 of the adapter 6 through narrow openings and to position the free ends of the wires under the label of the bottle 1. At the ends of the wires, flat poles are then preferably provided via which the wires can be contacted and the rechargeable battery can thus be charged. The rechargeable battery can thus be charged as needed. If a printed circuit board 66 is provided, it can comprise a switch that can be activated by a magnet. This allows the switch to be switched from the outside by means of the magnet so that the top part 62 of the adapter 6 does not have to be removed, for example, in order to switch on or off a ring-shaped LED array on the printed circuit board 66.

The invention claimed is:

1. A method for producing a bottle having a body and neck, the method comprising:
   forming a sidewall of the body with an inwardly extending recess so that, at a cross-section of the bottle through the recess, an opening of the recess is flush with an imaginary circle surrounding an exterior surface of the bottle;
   accommodating an object in an at least partially flexible adapter;
   positioning the at least partially flexible adapter, which is accommodating the object, in the recess, whereby the object is detachably attachable in the recess,
   wherein the recess includes a base opposite the opening and the recess conically widens from the base to the opening.

2. The method according to claim 1, wherein the bottle is a beverage bottle formed of glass.

3. The method according to claim 1, wherein the recess is formed without undercutting or grooving.

4. The method according to claim 1, wherein the recess is embodied in the form of a circle.

5. The method according to claim 1, wherein the recess is embodied with a flat base.

6. The method according to claim 1, wherein the bottle is formed with the recess during the shaping of the bottle.

7. The method according to claim 1, wherein the sidewall is arranged between a bottle bottom and a bottle neck.

8. The method according to claim 1, wherein the at least partially flexible adapter is made of plastic.

9. The method according to claim 1, wherein the at least partially flexible adapter comprises a multi-part adapter comprising a bottom part and a top part, and the object is accommodated between the bottom part and the top part.

10. The method according to claim 9, wherein the top part, when the at least partially flexible adapter is positioned in the recess, is flush with the exterior surface of the bottle.

11. The method according to claim 9, further comprising positioning an intermediate piece between the bottom part and the top part in order to fix the object in place.

12. The method according to claim 1, wherein the object is a coin.

13. A method for producing a glass beverage bottle having a body and neck, the method comprising:
   forming a sidewall of the body with at least one inwardly extending recess; and
   positioning an at least partially flexible adapter, which is structured to removably accommodate an object, in the recess, whereby the object is detachably attachable in the recess;
   wherein the at least partially flexible adapter is part of a multi-part adapter, which also includes a bottom part and a top part, and the at least partially flexible adapter is positionable between the bottom part and the top part, and
   wherein the bottom part of the adapter includes a harder component part and a softer component part, wherein the harder component part is fixed to the bottle.

14. The method according to claim 13, further comprising detachably connecting the harder component part to the softer component part, which are structured so that one of the harder and softer component parts fit into the other of the harder and softer component parts.

15. The method according to claim 13, further comprising fitting the top part of the adapter onto the softer component part.

16. A bottle comprising:
   a sidewall having an inwardly formed recess so that, at a cross-section of the bottle through the recess, an opening of the recess is flush with an imaginary circle surrounding an exterior surface of the bottle; and
   an at least partially flexible adapter, which is structured to accommodate an object and which is to be positioned in the recess, whereby the object is detachably attachable in the recess,
   wherein the recess includes a base opposite the opening and the recess conically widens from the base to the opening.

17. The bottle according to claim 16, wherein the bottle is a beverage bottle formed of glass.

18. The bottle according to claim 16, wherein the recess is formed without undercutting or grooving.

19. The bottle according to claim 16, wherein the recess is embodied in the form of a circle.

20. The bottle according to claim 16, wherein the base of the recess is embodied as a flat base.

21. The bottle according to claim 16, wherein the adapter is formed from plastic and the object is formed from material that is less deformable than the plastic.

22. The bottle according to claim 16, wherein the adapter comprises a bottom part and a top part that are structured to accommodate the object between the bottom part and the top part.

23. The bottle according to claim 22, wherein the top part, when the at least partially flexible adapter is positioned in the recess, is flush with the exterior surface of the bottle.

24. A glass beverage bottle comprising:
   a sidewall having an inwardly formed recess;
   an object which is detachably attachable in the recess; and
   an at least partially flexible adapter structured to be positionable in the recess and to accommodate the object in the recess,
   wherein the adapter is comprises at least a bottom part and a top part, and in the object is accommodated between the bottom part and the top part, and
   wherein the bottom part of the adapter is formed with a harder component and a softer component, and the harder component is fixed to the recess.

25. The bottle according to claim 24, wherein the harder component and the softer component are structured to be detachably connectable to each other by one of the harder and softer component fitting into the other of the harder and softer component.

26. The bottle according to claim 24, wherein the top part of the adapter is structured to be fitted onto the softer component.

27. The bottle according to claim 24, further comprising an intermediate piece positionable between the bottom part and the top part of the adapter in order to fix the object in place.

\* \* \* \* \*